(12) United States Patent
Jiang

(10) Patent No.: US 7,428,157 B2
(45) Date of Patent: Sep. 23, 2008

(54) APPARATUS AND METHOD FOR VIRTUALLY SHIELDING A SYNCHRONOUS SWITCHING REGULATOR

(75) Inventor: Xuesong Jiang, Edison, NJ (US)

(73) Assignee: Analog Devices, Inc., Norwood, MA (US)

(*) Notice: Subject to any disclaimer, the term of this patent is extended or adjusted under 35 U.S.C. 154(b) by 48 days.

(21) Appl. No.: 11/096,967

(22) Filed: Apr. 1, 2005

(65) Prior Publication Data

US 2006/0220624 A1    Oct. 5, 2006

(51) Int. Cl.
*H02M 5/45* (2006.01)

(52) U.S. Cl. .................. 363/37; 363/141; 318/811; 307/155

(58) Field of Classification Search ....... 361/91.1–91.3, 361/90, 92, 110, 111, 93; 257/728, 724, 257/532, 698; 363/35, 37, 41, 127, 132, 363/131, 141; 307/150, 155, 42, 82, 38; 318/811, 807, 439, 800
See application file for complete search history.

(56) References Cited

U.S. PATENT DOCUMENTS 5,754,732 A *  5/1998  Vlahu .................. 388/811
6,198,642 B1 *  3/2001  Kociecki .................. 363/37
6,965,219 B2 * 11/2005  Brooks et al. ............ 323/282
7,002,249 B2 *  2/2006  Duffy et al. .............. 257/728
7,023,672 B2 *  4/2006  Goodfellow et al. ...... 361/18

OTHER PUBLICATIONS

Redmond, Catherine, *Winning the Battle Against Latch-up in CMOS Analog Switches*, Analog Dialogue 35-05, 2001, 3 pages, no date.
Roider, *International Search Report and Written Opinion of the International Searching Authority*, PCT/US2006/011603, 10 pages, Jul. 18, 2006.

* cited by examiner

*Primary Examiner*—Rajnikant B. Patel
(74) *Attorney, Agent, or Firm*—Bromberg & Sunstein LLP

(57) ABSTRACT

Virtual shielding is used to reduce the sources/origins of latchup and switching noise in a synchronous switching regulator. The regulator power stage may be split into two half stages. The ground bond wires of the half power stages may be positioned on opposite sides of the layout to substantially eliminate coupling between the ground bond wires. The power supply bond wire in one half power stage and the ground bond wire in the other half power stage may be positioned such that the mutual inductance between the power supply bond wire and the ground bond wire is maximized. The controller ground may be positioned substantially midway between the power supply bond wire in one half power stage and a respective ground bond wire in the other half power stage. The regulator controller may be placed between the regulator power stage and other analog circuitry to isolate the regulator power stage from the analog circuitry.

9 Claims, 4 Drawing Sheets

Ground bounce in AGND. Top graph: only PVDD next to AGND; Center graph: AGND is between PVDD and PGND; Bottom graph: only PGND next to AGND.

Ground bounce in PGND when coupling coefficient between PVDD and PGND boundwires K=1

US 7,428,157 B2

APPARATUS AND METHOD FOR VIRTUALLY SHIELDING A SYNCHRONOUS SWITCHING REGULATOR

FIELD OF THE INVENTION

The present invention relates generally to electronic systems, and, more particularly, to shielding a synchronous switching regulator from precision analog blocks or other circuitry.

BACKGROUND OF THE INVENTION

There is a general drive in the electronics industry to integrate many different types of circuits on a single chip. Among other things, such integrated circuitry can be less expensive, consume less power, and be smaller than corresponding discrete circuits or separate chip devices. There is a related drive to shrink the circuitry as much as possible so that different circuit components are often placed very close together. This can lead to interference between components.

In certain types of communication devices, it is desirable to integrate both precision analog circuitry and a synchronous switching regulator on a single chip. Such an arrangement can be affected by both latchup and switching noise. As discussed in an article entitled *Winning the Battle Against Latchup in CMOS Analog Switches* by Catherine Redmond, published by Analog Devices Inc. in its technical magazine Analog Dialogue, Volume 35, Number 5, October, 2001, which is hereby incorporated herein by reference in its entirety, latchup may be defined as the creation of a low-impedance path between power supply rails as a result of triggering a parasitic device. Switching noise is the generation of unwanted electrical interference on electrical conductors. Typically, latchup and switching noise is reduced by spatial separation of components, the use of guard rings around components, and/or the use of a deep N-well between components. These types of solutions may not be practical in certain implementations, particularly when trying to minimize chip area with a compact layout and when using a commercial non-epi CMOS process without deep N-well.

SUMMARY OF THE INVENTION

Virtual shielding is used to reduce the sources/origins of latchup and switching noise in a synchronous switching regulator. The regulator power stage may be split into two half stages. The ground bond wires of the half power stages may be positioned on opposite sides of the layout to substantially eliminate coupling between the ground bond wires. The power supply bond wire in one half power stage and the ground bond wire in the other half power stage may be positioned next to each other such that the mutual inductance between the power supply bond wire and the ground bond wire is maximized. The controller ground may be positioned substantially midway between the power supply bond wire in one half power stage and a respective ground bond wire in the other half power stage. The regulator controller may be placed between the regulator power stage and other analog circuitry, effectively used as a guard band, to isolate the regulator power stage from the analog circuitry.

In accordance with one aspect of the invention there is provided a synchronous switching regulator including a regulator controller having a controller ground and a regulator power stage in communication with the regulator controller. The regulator power stage has a layout including substantially identical first and second half power stages. Each half power stage has its own ground bond wire. The ground bond wires of the half power stages are positioned on opposite sides of the layout to substantially eliminate coupling between the ground bond wires.

Each half power stage may further have its own power supply bond wire. The power supply bond wire in one half power stage and the ground bond wire in the other half power stage may be positioned next to each other such that the mutual inductance between the power supply bond wire and the ground bond wire is maximized. The controller ground may be positioned midway between the power supply bond wire in one half power stage and a respective ground bond wire in the other half power stage. The synchronous switching regulator may include means for matching the mutual inductance between the power supply bond wire and the regulator controller ground bond wire, and the mutual inductance between the ground bond wire and the regulator controller ground bond wire. The layout may be substantially rectangular.

In accordance with another aspect of the invention there is provided a synchronous switching regulator including a regulator controller having a controller ground and a regulator power stage in communication with the regulator controller. The regulator power stage has a layout including substantially identical first and second half power stages. Each half power stage has its own power supply bond wire and ground bond wire. The controller ground is positioned substantially midway between the power supply bond wire in one half power stage and a respective ground bond wire in the other half power stage.

The ground bond wires may be positioned on opposite sides of the layout to substantially eliminate coupling between the ground bond wires. The power supply bond wire in one half power stage and the ground bond wire in the other half power stage may be positioned next to each other such that the mutual inductance between the power supply bond wire and the ground bond wire is maximized. The synchronous switching regulator may include means for matching the mutual inductance between the power supply bond wire and the regulator controller ground bond wire, and the mutual inductance between the ground bond wire and the regulator controller ground bond wire. The layout may be substantially rectangular.

In accordance with another aspect of the invention there is provided apparatus including a synchronous switching regulator and analog circuitry. The synchronous switching regulator includes a regulator controller and a regulator power stage. The regulator controller is positioned between the analog circuitry and the regulator power stage to substantially isolate the analog circuitry from the regulator power stage.

The regulator power stage may have a layout including substantially identical first and second half power stages. Each half power stage may have its own ground bond wire. The ground bond wires may be positioned on opposite sides of the layout to substantially eliminate coupling between the ground bond wires. Each half power stage may further have its own power supply bond wire. The power supply bond wire in one half power stage and the ground bond wire in the other half power stage may be positioned next to each other such that the mutual inductance between the power supply bond wire and the ground bond wire is maximized. The controller ground may be positioned midway between the power supply bond wire in one half power stage and a respective ground bond wire in the other half power stage. The synchronous switching regulator may include means for matching the mutual inductance between the power supply bond wire and the regulator controller ground bond wire, and the mutual inductance between the ground bond wire and the regulator controller ground bond wire. The layout may be substantially rectangular. The analog circuitry and the synchronous switching regulator may be formed on a substrate, in which case the rectangular layout may have a high aspect ratio along one side of the substrate. The analog circuitry may include an analog-to-digital converter and/or a digital-to-analog converter. The synchronous switching regulator may be a synchronous buck step-down regulator.

BRIEF DESCRIPTION OF THE DRAWINGS

The foregoing and advantages of the invention will be appreciated more fully from the following further description thereof with reference to the accompanying drawings wherein.

DETAILED DESCRIPTION OF A PREFERRED EMBODIMENT

Embodiments of the present invention employ "virtual" shielding to reduce latchup and switching noise. Virtual shielding reduces the sources/origins that cause latchup and switching noise. Virtual shielding can be used alone or in combination with other techniques, such as spatial separation, guard rings, and deep N-well.

Figure 1:
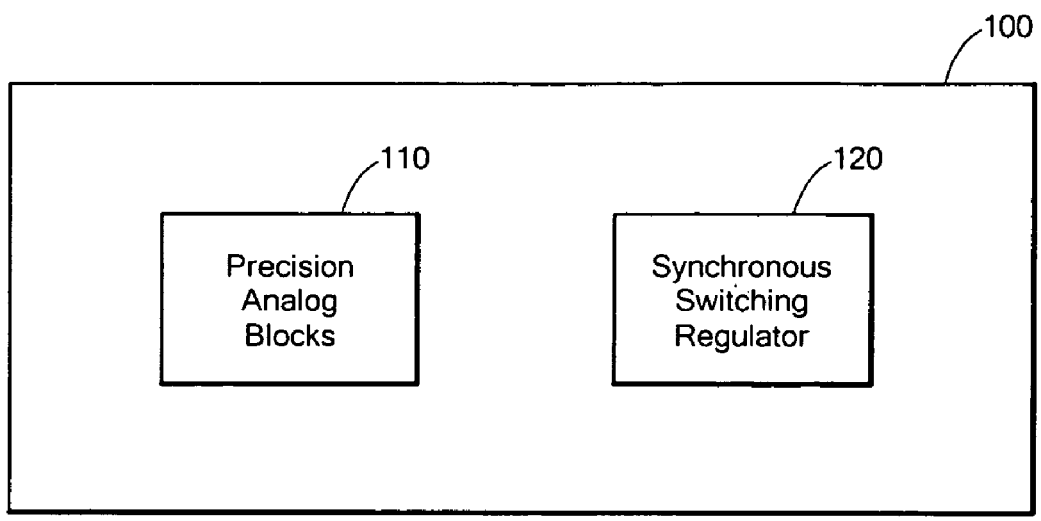
FIG. 1 is a block diagram showing a representation of a chip including both precision analog blocks and a synchronous switching regulator, in accordance with an embodiment of the present invention.

FIG. 1 is a block diagram showing a representation of a chip 100 including both precision analog blocks 110 and a synchronous switching regulator 120, in accordance with an embodiment of the present invention. In a preferred embodiment of the present invention, the precision analog blocks 110 include ADSL (asymmetric digital subscriber line) front-end integrated circuitry including a 14-bit analog-to-digital converter and a 16-bit digital-to-analog converter, and the synchronous switching regulator is a 12 V-to-3.3 V, 300 mA, 2 MHz synchronous buck (step-down) regular.

Figure 2:
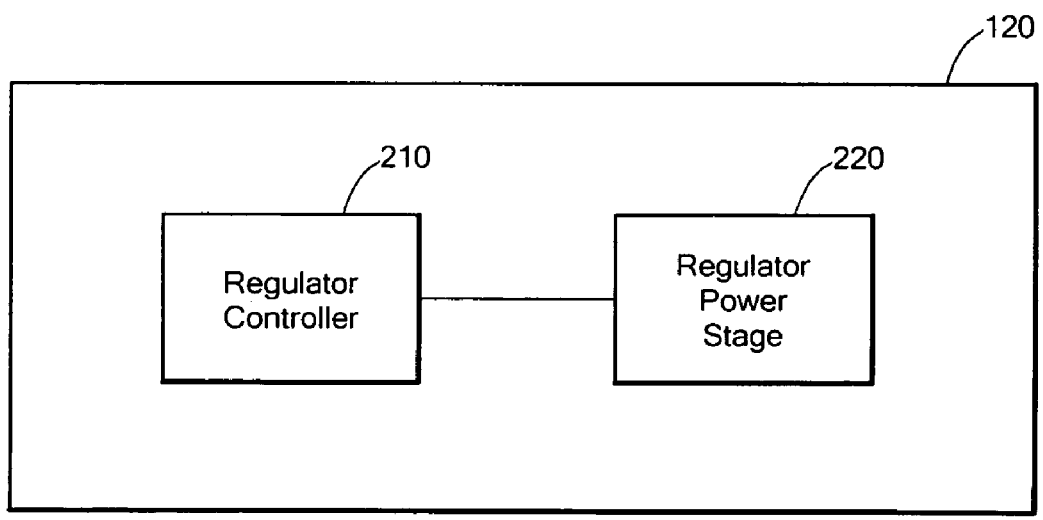
FIG. 2 is a block diagram showing the major logic blocks of a synchronous switching regulator in accordance with an embodiment of the present invention.

FIG. 2 is a block diagram showing the major logic blocks of the synchronous switching regulator 120 in accordance with an embodiment of the present invention. The synchronous switching regulator 120 is logically separated into a regulator controller 210 and a regulator power stage 220. The regulator controller 210 generates pulse-width modulated signals for controlling the regulator power stage 220.

Figure 3:
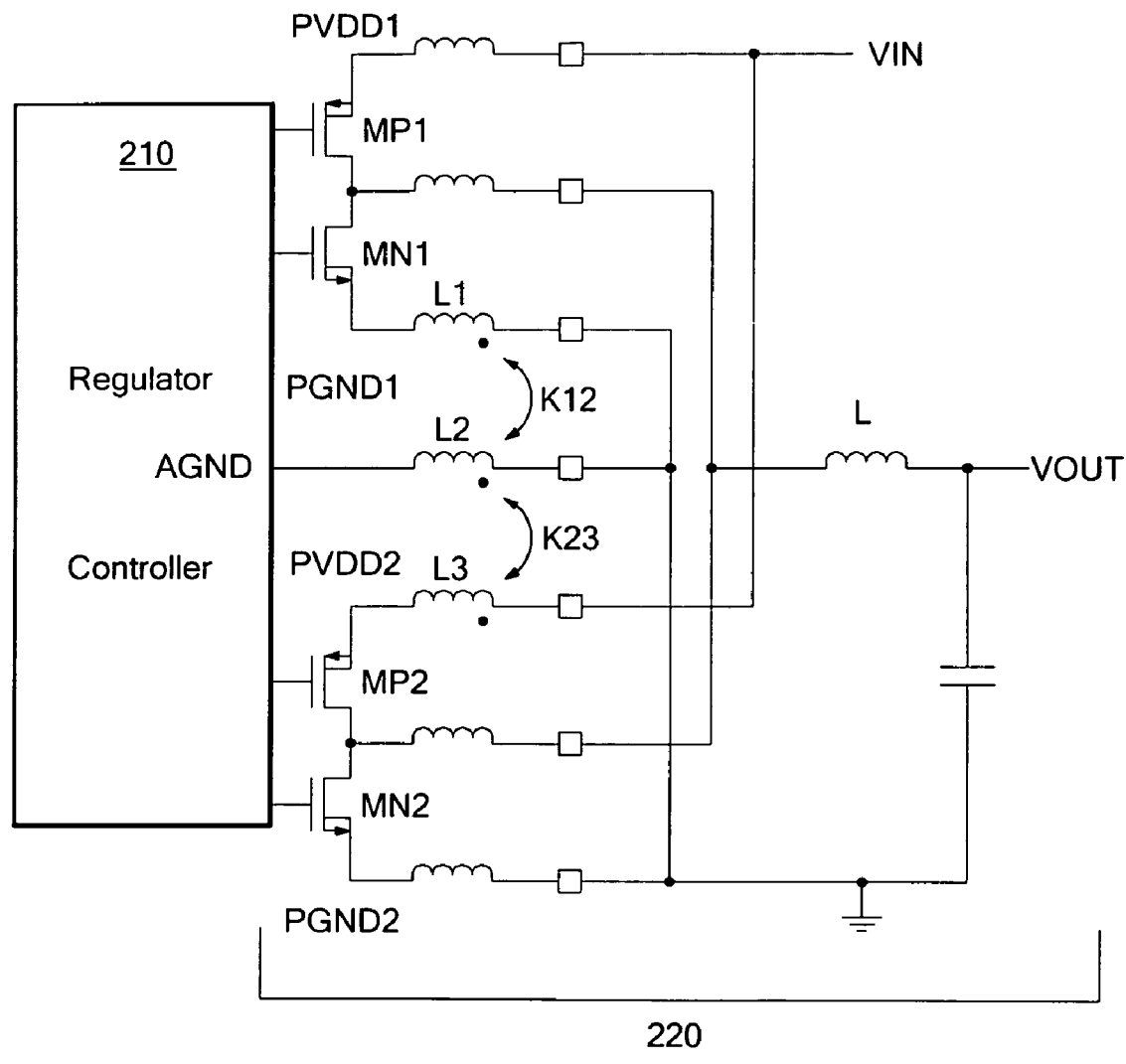
FIG. 3 is a schematic diagram showing additional details of the relevant components of a synchronous switching regulator in accordance with an embodiment of the present invention.

FIG. 3 is a schematic diagram showing additional details of the relevant components of the synchronous switching regulator 120 in accordance with an embodiment of the present invention. VIN is the regulator input and VO is the regulator output. MN1, MN2, MP1 and MP2 form the power stage of the regulator, which is controlled by the regulator controller block 210. MN1 and MN2 are identical NMOS transistors. The local substrates of these NMOS transistors are shorted to their source nodes, respectively. MP1 and MP2 are identical PMOS transistors that are inside separate N-wells. These two N-wells are shorted to the corresponding PMOS transistor's source nodes, respectively. The inductors in FIG. 3, except the external inductor L, are used to model the bondwires. K12 and K23 are coupling coefficients of mutual inductance between adjacent bondwires. K12 is for mutual inductance between L1 and L2. K23 is for mutual inductance between L2 and L3. PVDDs and PGNDs are supplies and grounds, respectively, for the power stage. AGND is the ground for the regulator controller block 210.

In the embodiment shown in FIG. 3, latchup and switching noise in the substrate is reduced using a combination of techniques, as described below. It should be noted that the different techniques can be employed separately or in various combinations as needed or desired in alternative embodiments of the invention.

A first technique uses the regulator controller 210 as a virtual guard band to help isolate the power transistors, especially MN1 and MN2, from the precision analog blocks 110. Specifically, the regulator controller 210 is positioned between the regulator power stage 220 and the rest of the chip.

Figure 4:
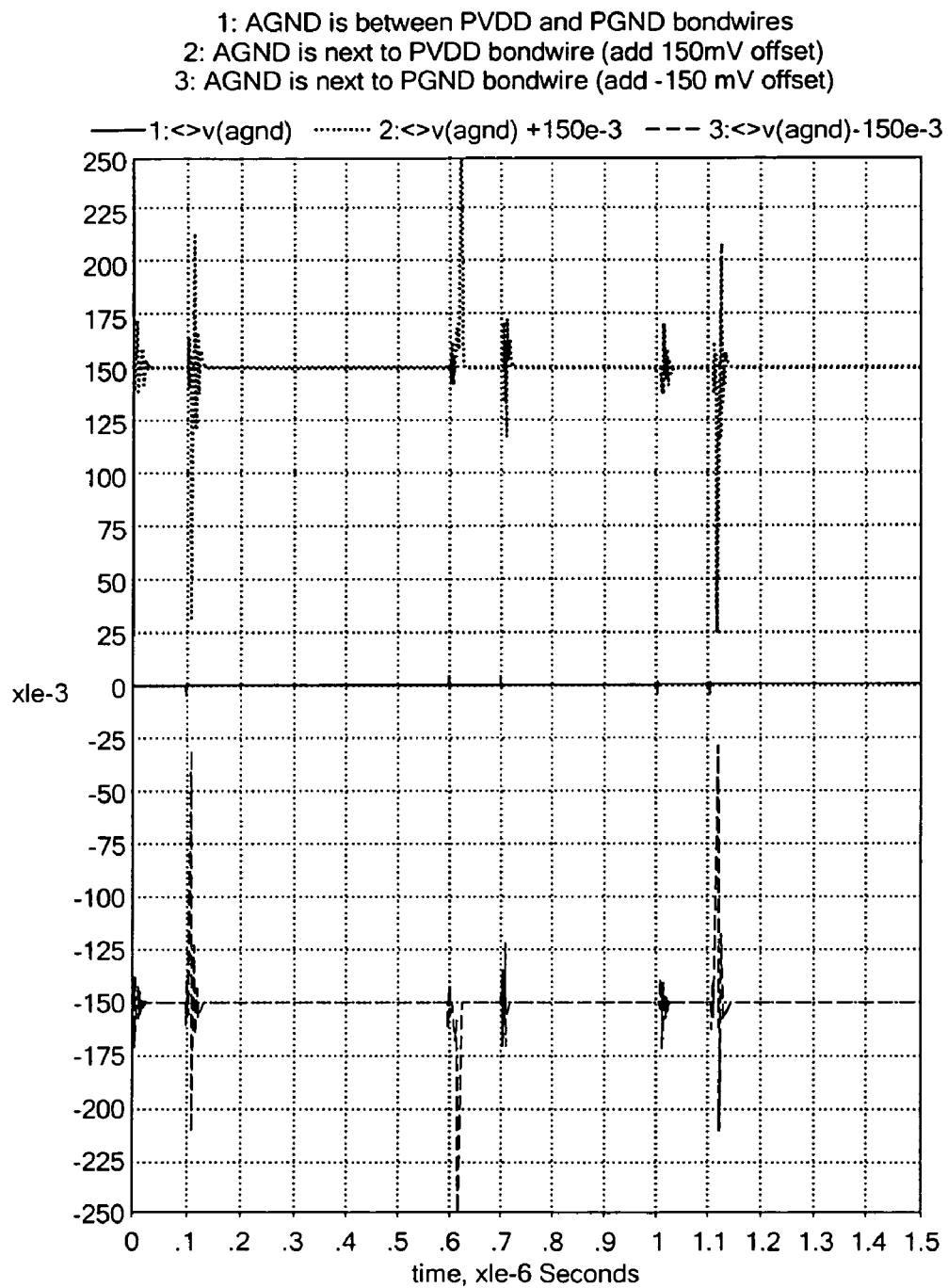
FIG. 4 shows plots of ground bounce in a regulator controller ground in various configurations.

A second technique employs a "quiet" ground (AGND) for the regulator controller 210 such that AGND will not inject noise into the substrate and nearby precision analog blocks 110. If AGND is noisy, the benefit of using the regulator controller 210 to isolate the regulator power stage 220 from the precision analog blocks 110 will diminish. However, as shown in FIG. 4, it is not easy to have a "quiet" ground in a compact layout when the AGND bondwire is close to either the PVDD bondwire or the PGND bondwire. In FIG. 4, the top trace is ground bounce in AGND when it is next to PVDD only. A 150 mV offset has been added to it in order to make the graph clearer. The bottom trace is ground bounce in AGND when it is next to PGND only. For the similar reason, a −150 mV offset has been added to it. The peak-to-peak amplitude of ground bounce is about 225 mV, which is quite large. In this simulation, K=0.5.

Thus in a preferred embodiment, the "quiet" ground AGND is obtained by placing the AGND bond pad in between bond pads for PVDD and PGND. As a result, the AGND bondwire L2 is between the PVDD bondwire L3 and the PGND bondwire L1. From FIG. 3, it can be seen that the current through the external inductor L comes from the supply bondwire and the ground bondwire. Neglecting the current needed to charge or discharge the capacitance at the drain nodes of the power transistors during the switching transient, the current through the inductor can be estimated as follows:

$$I_{supply} + I_{ground} = I_{inductor} \quad (1)$$

where I(supply) is the current through the supply bondwire, I(ground) is the current through the ground bondwire, and I(inductor) is the current through the external inductor L. Since during the switching transient, the current through the external inductor L is almost constant, it can be shown that:

$$\frac{dI_{supply}}{dt} + \frac{dI_{ground}}{dt} = 0 \longrightarrow \frac{dI_{supply}}{dt} = -\frac{dI_{ground}}{dt} \quad (2)$$

Thus the rate of change of current in the supply bondwire is substantially equal to the rate of change of current in the ground bondwire, with opposite signs.

In FIG. 3, if the AGND bondwire L2 is between the PGND bondwire L1 and the PVDD bondwire L3 and if the mutual inductances between L1, L2 and L2, L3 are presumed to be equal, it can be shown that:

$$V_{agnd} = M\frac{dI_{supply}}{dt} + M\frac{dI_{ground}}{dt} = 0 \quad (3)$$

Thus, noise coupled to the AGND bondwire from the PVDD bondwire substantially cancels the coupling from the PGND bondwire, resulting in a "quiet" AGND. The center trace in FIG. 4 shows simulation results when the AGND bondwire is in the middle of the PVDD and PGND bondwires. The peak-to-peak amplitude of ground bounce is less than 10 mV. In reality, the mutual inductances between adjacent bondwires cannot be perfectly matched, although some improvement in AGND ground bounce should still be realized.

A third technique attempts to minimize or reduce ground bondwire inductance in order to reduce di/dt induced ground bounce in PGND by splitting the regulator's power transistors and minimizing mutual inductance between ground bondwires.

One advantage of splitting the regulator's power transistors is that it allows the regulator to be laid out in a rectangular area with a high aspect ratio along one side of the chip layout.

Another advantage of splitting the regulator's power transistors is that it reduces both current density and resistance in the power buses, which allows the regulator to handle large load current and improves the regulator's efficiency.

Another advantage of splitting the regulator's power transistors is that it allows the ground bond pads of the half power stages to be positioned on opposite sides of the regulator layout so that there is almost no coupling between the two ground bondwires, thereby reducing switching noise (particulary di/dt induced ground bounce) through reduced ground bondwire inductance. It is known that bondwire inductance can be reduced by using multiple bondwires in parallel, but the reduction is considerably limited by mutual inductance between adjacent bondwires. For example, supposing a single bondwire's inductance is L and the coupling coefficient between adjacent bondwires is 0.5, then the total inductance of two adjacent bondwires in parallel is 0.75 L instead 0.5 L. By splitting the power transistors and positioning the ground bond pads of the half power stages on opposite sides of the regulator layout, the total ground bondwire inductance is reduced close to 0.5 L.

Another advantage of splitting the regulator's power transistors is that di/dt induced ground bounce can be further reduced by positioning the PGND bondwire close to the PVDD bondwire. If a supply bondwire is next to a ground bondwire, the ground bounce in ground bondwire can be estimated as:

$$V = L\frac{dI_{ground}}{dt} + M\frac{dI_{supply}}{dt} = (L-M)\frac{dI_{ground}}{dt} \quad (4)$$

Figure 5:
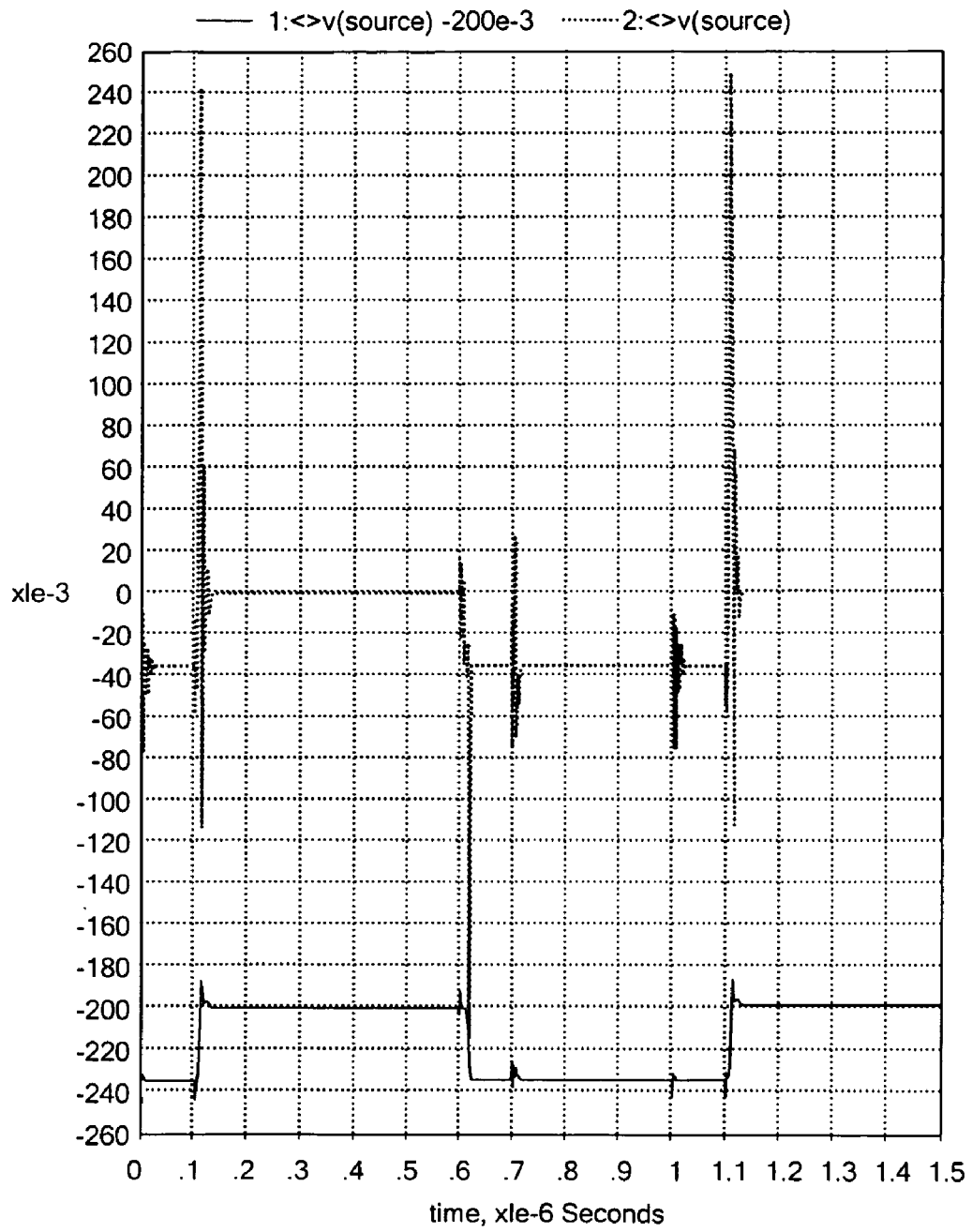
FIG. 5 shows plots of ground bounce in a power stage ground in various configuration.

FIG. 5 compares simulation results of two cases: K=0 (the top trace, no coupling between PGND bondwire and PVDD bondwire) and K=1 (the bottom trace, significant coupling between PGND bondwire and PVDD bondwire, −200 mV offset is added to it). When there is no coupling between the PGND bondwire and the PVDD bondwire, the peak-to-peak amplitude of ground bounce is 460 mV. With strong coupling between the PVDD bondwire and the PGND bondwire, the ground bounce in PGND is considerably reduced to approximately 10 mV. In general, K is less than one, although some improvement should still be realized when there is a nearby PVDD bondwire to a PGND bondwire.

The present invention may be embodied in other specific forms without departing from the true scope of the invention. The described embodiments are to be considered in all respects only as illustrative and not restrictive.

What is claimed is:

1. A synchronous switching regulator comprising:
    a regulator controller having a controller ground; and
    a regulator power stage in communication with the regulator controller, the regulator power stage having a layout including substantially identical first and second half power stages, each half power stage having its own ground bond wire, the ground bond wires of the half power stages positioned on opposite sides of the layout to substantially eliminate coupling between the ground bond wires, each half power stage further having its own power supply bond wire, the controller ground positioned substantially midway between the power supply bond wire in one half power stage and a respective ground bond wire in the other half power stage; and
    means for matching the mutual inductance between the power supply bond wire and the regulator controller ground bond wire and for matching the mutual inductance between the ground bond wire and the regulator controller ground bond wire.

2. A synchronous switching regulator according to claim 1, wherein the power supply bond wire in one half power stage and the ground bond wire in the other half power stage are positioned next to each other such that the mutual inductance between the power supply bond wire and the ground bond wire is maximized.

3. A synchronous switching regulator comprising:
    a regulator controller having a controller ground;
    a regulator power stage in communication with the regulator controller, the regulator power stage having a layout including substantially identical first and second half power stages, each half power stage having its own power supply bond wire and ground bond wire, the controller ground positioned substantially midway between the power supply bond wire in one half power stage and a respective ground bond wire in the other half power stage; and
    means for matching the mutual inductance between the power supply bond wire and the regulator controller ground bond wire and for matching the mutual inductance between the ground bond wire and the regulator controller ground bond wire.

4. A synchronous switching regulator according to claim 3, wherein the ground bond wires of the half power stages are positioned on opposite sides of the layout to substantially eliminate coupling between the ground bond wires.

5. A synchronous switching regulator according to claim 3, wherein the power supply bond wire in one half power stage and the ground bond wire in the other half power stage are positioned next to each other such that the mutual inductance between the power supply bond wire and the ground bond wire is maximized.

6. Apparatus comprising:
    analog circuitry;
    a synchronous switching regulator including a regulator controller and a regulator power stage, the regulator controller positioned between the analog circuitry and the regulator power stage to substantially isolate the analog circuitry from the regulator power stage, the regulator power stage having a layout including substantially identical first and second half power stages, each half power stage having its own ground bond wire, the ground bond wires of the half power stages positioned on opposite sides of the layout to substantially eliminate coupling between the ground bond wires, each half power stage further having its own power supply bond wire, the controller ground positioned substantially midway between the power supply bond wire in one half power stage and a respective ground bond wire in the other half power stage; and means for matching the mutual inductance between the power supply bond wire and the regulator controller ground bond wire and for matching the mutual inductance between the ground bond wire and the regulator controller ground bond wire.

7. Apparatus according to claim 6, wherein each half power stage further has its own power supply bond wire, and wherein the power supply bond wire in one half power stage and the ground bond wire in the other half power stage are positioned next to each other such that the mutual inductance between the power supply bond wire and the ground bond wire is maximized.

8. Apparatus according to claim 6, wherein the analog circuitry and the synchronous switching regulator are formed on a substrate, and wherein the layout is substantially rectangular with a high aspect ratio along one side of the substrate.

9. Apparatus according to claim 6, wherein the analog circuitry comprises one of:
- an analog-to-digital converter;
- a digital-to-analog converter; and
- a synchronous buck step-down regulator.

\* \* \* \* \*